United States Patent
Krinke et al.

(10) Patent No.: US 6,305,924 B1
(45) Date of Patent: Oct. 23, 2001

(54) STACKED LAMINATE MOLD

(75) Inventors: Harlan L. Krinke, Marine-on-St.Croix; Mark E. Reeves, Mahtomedi, both of MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/702,596

(22) Filed: Oct. 31, 2000

Related U.S. Application Data

(62) Division of application No. 09/101,698, filed as application No. PCT/US96/01250 on Jan. 26, 1996, now Pat. No. 6,159,407.

(51) Int. Cl.$^7$ .............................. B29C 33/42; B29C 33/44
(52) U.S. Cl. ................... 425/175; 425/195; 425/DIG. 30
(58) Field of Search ................................... 264/219, 225, 264/226, 227; 425/175, 195

(56) References Cited

U.S. PATENT DOCUMENTS

| | | |
|---|---|---|
| 1,591,572 | 7/1926 | Stimson . |
| 2,264,146 | 11/1941 | Crane . |
| 2,306,732 | 12/1942 | Huxham . |
| 3,027,595 | 4/1962 | Taki et al. . |
| 3,069,721 | 12/1962 | Arni et al. . |

(List continued on next page.)

FOREIGN PATENT DOCUMENTS

| | | |
|---|---|---|
| 1 917 292 | 4/1969 | (DE) . |
| 42 36 799 A1 | 10/1992 | (DE) . |
| 44 10 994 C2 | 1/1996 | (DE) . |
| 1 152 445 | 6/1956 | (FR) . |
| 1 289 029 | 4/1961 | (FR) . |
| 2 262 899 A | 7/1993 | (GB) . |
| 60-20865 | 2/1985 | (JP) . |

OTHER PUBLICATIONS

Injection Molding Handbook, VanNorstrand Reinhold Company, pp. 753–756.

Primary Examiner—David A. Simmons
Assistant Examiner—Robert A. Hopkins
(74) Attorney, Agent, or Firm—James J. Trussell; Stephen C. Jensen

(57) ABSTRACT

A method of forming a stacked laminate mold. The method comprises the steps of: a) orienting a plurality of plates to have their respective major planes at a first angle relative to a fixed reference plane and parallel to one another, each of the plates including opposed parallel first and second major surfaces defining therebetween the major plane of each of the plurality of plates, each of the plates further including a mold surface connecting the first and second major surfaces; b) forming a groove in the plurality of plates, the groove including a groove surface defined by cylindric surface that is the construct of translating a two-dimensional groove profile through the plate along a line that is oblique to at least one of the plate major surface and the plate mold surface, and wherein the groove surface intersects each respective plate first major surface and each respective plate mold surface; and thereafter c) reorienting the plates to have their respective major planes at a second angle relative to the reference for molding. Also disclosed is a stacked laminate mold. The mold comprises a plurality of plates, each of the plates including: opposed parallel first and second major surfaces defining therebetween a major plane of each of the plurality of plates; a mold surface connecting the first and second major surfaces; and a plurality of cavities in each of the plurality of plates. Each of the cavities is open at least to the mold surface and includes a cavity surface defined by cylindric surface that is the construct of translating a two-dimensional cavity profile through the plate along a line that is oblique to at least one of the plate major surface and the plate minor surface, and the cavity surface intersects each respective plate first major surface and each respective plate mold surface. The first major surface of a first one of the plurality of plates is adjacent the second major surface of a second one of the plurality of plates.

34 Claims, 7 Drawing Sheets

U.S. PATENT DOCUMENTS

| | | |
|---|---|---|
| 3,147,528 | 9/1964 | Erb . |
| 3,196,490 | 7/1965 | Erb . |
| 3,214,777 | 11/1965 | Kutik . |
| 3,312,583 | 4/1967 | Rochlis . |
| 3,649,153 | 3/1972 | Brudy . |
| 3,687,413 | 8/1972 | Murfitt et al. . |
| 3,689,346 | 9/1972 | Rowland . |
| 3,758,657 | 9/1973 | Menzin et al. . |
| 3,762,000 | 10/1973 | Menzin et al. . |
| 4,066,236 | 1/1978 | Lindner . |
| 4,073,568 | 2/1978 | Heasley . |
| 4,095,773 | 6/1978 | Lindner . |
| 4,508,256 | 4/1985 | Radel et al. . |
| 4,561,456 | 12/1985 | Gueret . |
| 4,576,850 | 3/1986 | Martens . |
| 4,601,868 | 7/1986 | Radel et al. . |
| 4,752,352 | 6/1988 | Feygin . |
| 4,871,623 | 10/1989 | Hoopman et al. . |
| 4,872,243 | 10/1989 | Fischer . |
| 5,070,606 | 12/1991 | Hoopman et al. . |
| 5,234,740 | 8/1993 | Reeves et al. . |
| 5,300,263 | 4/1994 | Hoopman et al. . |
| 5,317,805 | 6/1994 | Hoopman et al. . |
| 5,320,515 | 6/1994 | Sargent, III et al. . |
| 5,368,549 | 11/1994 | McVicker . |
| 5,458,950 | 10/1995 | Bredenick et al. . |

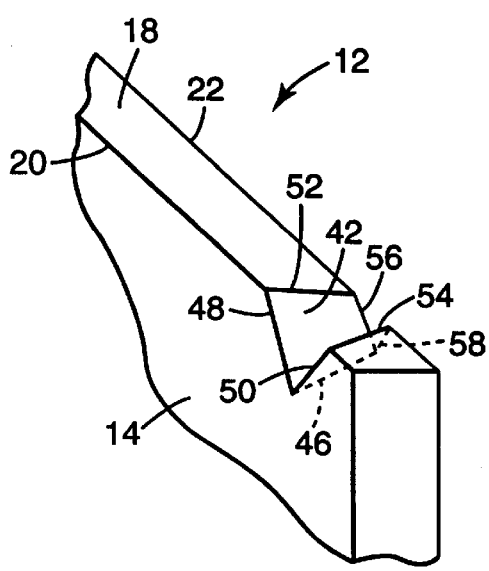
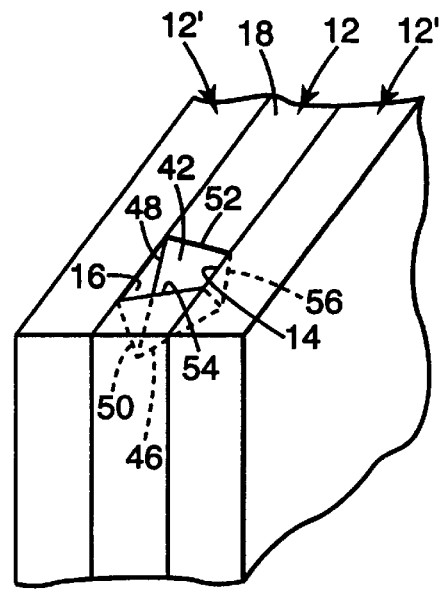
Fig. 8
Fig. 9
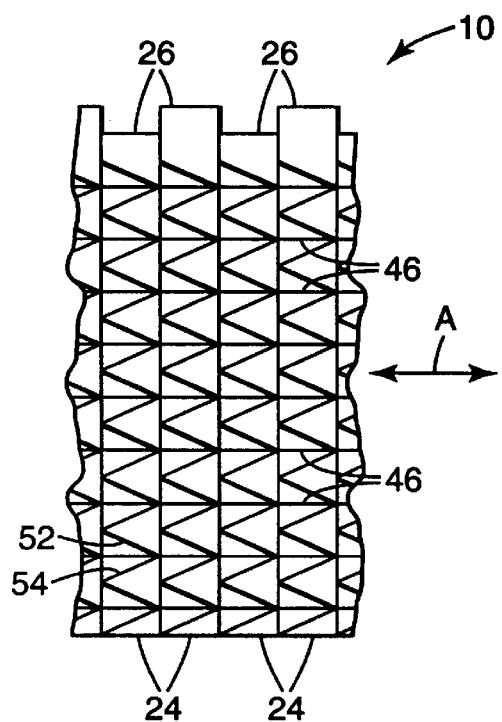
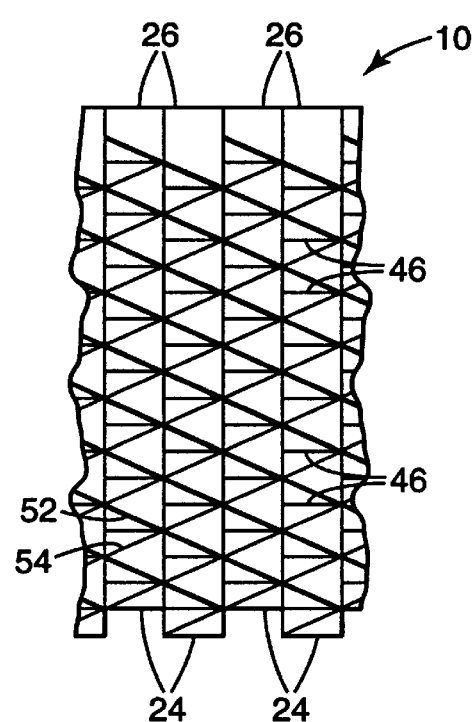
Fig. 10
Fig. 11

STACKED LAMINATE MOLD

This is a divisional of application Ser. No. 09/101,698 filed Jul. 14, 1998, now U.S. Pat. No. 6,159,407. Which is a 371 of PCT/US96/01250 filed Jan. 26, 1996.

TECHNICAL FIELD

The present invention relates generally to methods of forming a mold and to such a mold, and more particularly to methods of forming stacked laminate molds and to such stacked laminate molds.

BACKGROUND OF THE INVENTION

Stacked laminate molds and their use are known. In one known mold, a plurality of plates can be formed having V-shaped grooves cut through a top edge of the plate with the V-shaped groove extending from a first surface to a second surface of the plate with the bottom of the groove being parallel to the top surface of the plate. Adjacent plates may be staggered such that the grooves in one plate are bounded by the major surfaces of the plates in front and in back of such plate. Such plates have been known to be used, for example, for forming molded piled products. One example of a stacked laminate mold is taught in U.S. Pat. No. 3,312,583, "Apertured and Staggered Molded Piled Product" (Rochlis).

It has also been known to use stacked laminate molds for making the hook component of hook-and-loop fasteners. In such molds, it is known to form complex hook-shaped engaging members with a stacked laminate mold by etching or engraving a cavity into a major surface of a mold plate, the cavity having the desired hook configuration such as a J-hook or nail headed hook member. The cavity is open to the top surface of the stacked laminate mold. A plurality of such hooks can be formed across the length of one mold plate, with a plurality of similarly configured mold plates placed adjacent to one another. All of the plates may include cavities, or spacer plates without cavities may be placed between plates with cavities. Such stacked laminate molds can be used for batch production, that is for making discrete lengths and widths of molded products having a plurality of hooks. See for example U.S. Pat. Nos. 3,147,528, "Separable Fastener Element" (Erb); and 5,368,549, "Method for Injection-Molding an Orthopedic Device and Product of the Method" (McVicker). It is also known to use circular-shaped stacked laminate molds for continuous production of molded strips having a plurality of hooks. See for example U.S. Pat. Nos. 3,762,000, "Production of a Continuous Molded Plastic Strip" (Menzin et al.); 3,196,490, "Apparatus for Manufacture of a Continuous Strip of Molded Plastic Product" (Erb); and 4,872,243, "Multi-Hook Fastener Member" (Fischer); and Rosato and Rosato, *Injection Molding Handbook*, VanNostrand Reinhold Company, pp. 753–56.

It has also been known to use stacked laminate molds in the production of retroreflective or triple-reflective material. The stacked laminates are generally configured so as to form three full surfaces of a cube when the adjacent plates are stacked together for molding the retroreflective product. See for example U.S. Pat. Nos. 1,591,572, "Process and Apparatus for Making Central Triple Reflectors" (Stimson); 3,649,153, "Faceted Core" (Brudy); 4,066,236, "Cube Corner Type Retroreflector Bodies and Molds Made Therewith" (Lindner); and 4,095,773, "Subassemblies for Cube Corner Type Retroreflector Molds" (Lindner); and German Provisional Publication (OS) 42 36 799 Al (Gubela).

Methods for forming an electrically conductive coating on non-conductive mold surfaces are known, as are methods for electrodepositing a metal coating onto a mold surface. See for example U.S. Pat. Nos. 4,871,623, "Sheet-Member Containing a Plurality of Elongated Enclosed Electrodeposited Channels and Method" (Hoopman et al.); and 5,070,606, "Method for Producing a Sheet Member Containing at Least One Enclosed Channel" (Hoopman et al.)

SUMMARY OF THE INVENTION

The present invention presents a stacked laminate mold, and methods of making stacked laminate molds. Such a stacked laminate mold may be used to mold a desired article or may be used to mold a subsequent mold. When the stacked laminate mold is used to mold a subsequent mold, an inverse of the stacked laminate mold can be made, for example, by electrodepositing a metal coating on the stacked laminate mold and removing the metal inverse from the stacked laminate mold. This metal inverse can be used to mold a desired article, or may itself be an intermediate mold. When the metal inverse is an intermediate mold, it is possible to form an inverse of the metal inverse to obtain a mold that is a replicate of the mold surface of the stacked laminate mold. Such a replicate can comprise, for example, an electrodeposited mold, a plastic mold, a silicone mold, or any other desired material.

In one preferred embodiment of the present invention, a stacked laminate mold is formed having cavities that are the inverse of the desired final article. Such a mold may be referred to as a "negative" mold, as its configuration is the negative of the final desired article. The stacked laminate negative is then used to produce a metal "positive" mold by electrodepositing a metal coating, such as nickel, onto the stacked laminate negative. This metal positive has a mold surface that is the same as, in other words a "positive" of, the surface of the final desired article. This metal positive is then used to form a "negative" mold that is a replicate of the original stacked laminate mold, having a configuration that is a negative of the final desired article. This negative mold can comprise any desired material, such as a suitable plastic or silicone composition. This final negative mold can then be used to form the final desired article. In one preferred embodiment, the molded article comprises a generally planar base sheet having a plurality of protrusions extending therefrom, the protrusions being formed by the cavities in the mold.

While the above-described system is a preferred embodiment, it is understood that the stacked laminate mold may be used to directly mold a desired article, or that any number of intermediate molds may be made on the way to molding the ultimate desired molded article. In that regard, it is understood that the stacked laminate mold may be either a negative or positive of the final desired article.

The stacked laminate mold of the present invention is made by a method which provides a convenient and accurate way of forming mold cavities having accurately controlled surfaces, and edges between surfaces that closely approach a true linear edge. This accuracy can be replicated in the subsequent intermediate molds and in the final molded article.

One preferred embodiment of the present invention presents a method of forming a stacked laminate mold. The method comprises the steps of: a) orienting a plurality of plates to have their respective major planes at a first angle relative to a fixed reference plane and parallel to one another, each of the plates including opposed parallel first and second major surfaces defining therebetween the major plane of each of the plurality of plates, each of the plates further including a mold surface connecting the first and second major surfaces; b) forming a groove in the plurality of plates, the groove including a groove surface defined by cylindric surface that is the construct of translating a two-dimensional groove profile through the plate along a line that is oblique to at least one of the plate major surface and the plate mold surface, and wherein the groove surface intersects each respective plate first major surface and each respective plate mold surface; and thereafter c) reorienting the plates to have their respective major planes at a second angle relative to the reference for molding.

In one preferred embodiment of the above method, upon performing step c), a plurality of mold cavities are provided, each of the mold cavities being open at the mold surface of the plates and being bounded at least by: i) a first cavity surface formed by the groove surface; and ii) a second cavity surface defined by the second major surface of a second one of the plurality of plates adjacent to the first major surface of the first plate.

In another preferred embodiment of the above method, the groove surface further intersects the plate second major surface.

In another preferred embodiment of the above method, the mold surfaces of the plurality of plates are coplanar upon performing step c). In another preferred embodiment, the mold surface of each of the plates is perpendicular to the respective first and second major surfaces of each plate.

In another preferred embodiment of the above method, step b) comprises forming a groove including a planar first groove surface, a planar second groove surface, and a base joining the first and second groove surfaces, wherein the first groove surface intersects each respective plate first major surface and each respective plate mold surface, wherein the second groove surface intersects each respective plate first major surface and each respective plate mold surface, and wherein the base is oblique relative to at least one of the major plane and the mold surface. In another embodiment, the first and second groove surfaces further intersect the plate second major surface. In another embodiment, the first and second groove surfaces intersect so as to form a linear groove base.

In another preferred embodiment of the above method, step b) comprises forming a plurality of grooves. This embodiment can further include the step of: d) moving a first one of the plurality of plates relative to a second and a third plate each adjacent the first plate, such that a cavity in the first plate formed by a first of the plurality of grooves is offset from cavities formed by the first groove in the second and third plates.

In another preferred embodiment, the above method includes the further step of: d) subsequent to step b), inserting a plurality of spacers into the mold such that a respective one of the plurality of spacers is adjacent a respective one of the plurality of plates, wherein each respective spacer overlays at least that portion of the first major surface of each respective plate intersected by the first and second groove surfaces.

Another preferred embodiment of the present invention presents a stacked laminate mold. The mold comprises a plurality of plates, each of the plates including: opposed parallel first and second major surfaces defining therebetween a major plane of each of the plurality of plates; a mold surface connecting the first and second major surfaces; and a plurality of cavities in each of the plurality of plates. Each of the cavities is open at least to the mold surface and includes a cavity surface defined by cylindric surface that is the construct of translating a two-dimensional cavity profile through the plate along a line that is oblique to at least one of the plate major surface and the plate minor surface, and the cavity surface intersects each respective plate first major surface and each respective plate mold surface. The first major surface of a first one of the plurality of plates is adjacent the second major surface of a second one of the plurality of plates.

In one preferred embodiment of the above mold, each of the mold cavities are open at the mold surface of the plates and are bounded at least by: i) a first cavity surface formed by the cavity surface; and ii) a second cavity surface defined by the second major surface of a second one of the plurality of plates adjacent to the first major surface of the first plate.

In another preferred embodiment of the above mold, the mold surfaces of each of the plurality of plates are coplanar. In another preferred embodiment of the mold, the mold surfaces of each of the plates is perpendicular to the respective first and second major surfaces of each plate.

In another preferred embodiment of the mold, the cavity surface includes a planar first cavity surface, a planar second cavity surface, and a base joining the first and second cavity surfaces. The first cavity surface intersects each respective plate first major surface and each respective plate mold surface, the second cavity surface intersects each respective plate first major surface and each respective plate mold surface, and the basic is oblique relative to at least one of the major plane and the mold surface. In one preferred embodiment of this mold, the first and second cavity surfaces intersect so as to form a linear cavity base. In another preferred embodiment, the first and second cavity surfaces further intersect the plate second major surface.

In another preferred embodiment of the above mold, the mold further comprises a plurality of spacers. A respective one of the plurality of spacers is adjacent a respective one of the plurality of plates and each respective spacer overlays at least that portion of the first major surface of each respective plate intersected by the first and second cavity surfaces.

BRIEF DESCRIPTION OF THE DRAWINGS

The present invention will be further explained with reference to the appended Figures, wherein like structure is referred to by like numerals throughout the several views, and wherein:

FIG. 8 is a view like FIG. 6 illustrating a second embodiment of the present invention;

FIG. 9 is a view like FIG. 7 of the second embodiment;

FIG. 10 is a top view of the stacked laminate mold of FIG. 3, with the plates oriented at a second angle and with a plurality of grooves formed therein, with the plates aligned along a first end thereof;

FIG. 11 is a view like FIG. 10, with the plates aligned along a second end thereof;

DETAILED DESCRIPTION OF THE INVENTION

Figure 1:
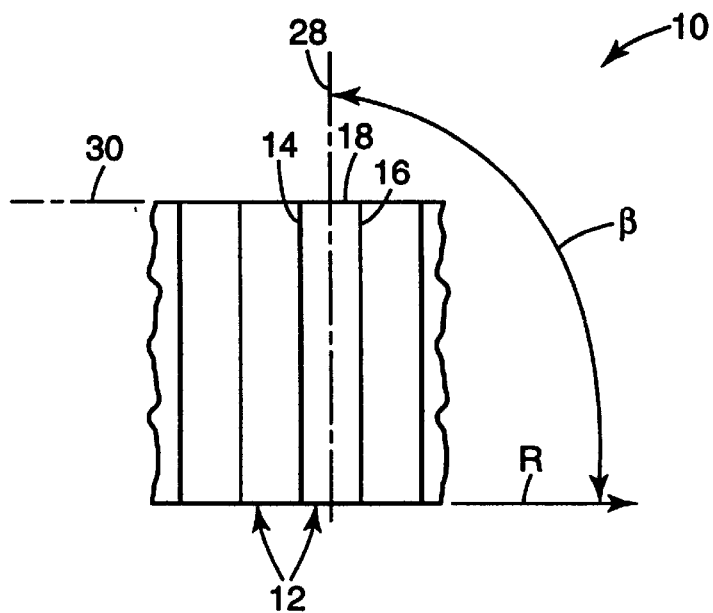
FIG. 1 is a side view of a plurality of plates according to the present invention, prior to forming a groove in the plates.
Figure 2:
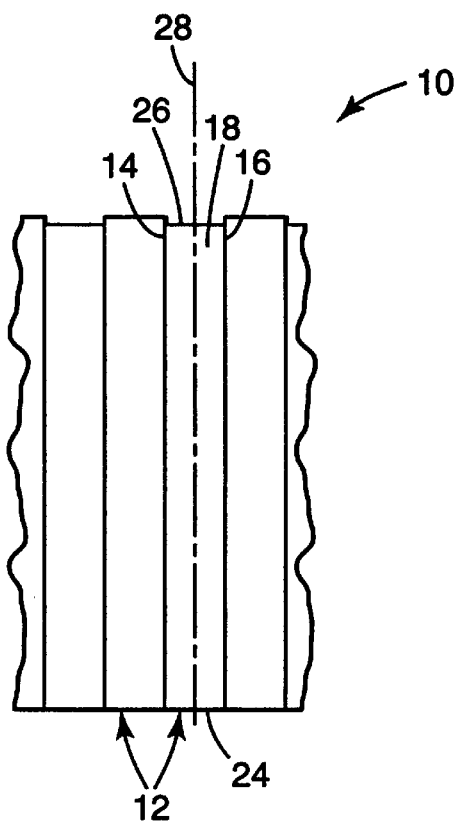
FIG. 2 is a top view of the plates of FIG. 1.

A first embodiment of the stacked laminate mold according to the present invention will now be described along with a preferred method of making such a mold. FIG. 1 is a side view of a plurality of plates 12 according to the present invention, prior to forming a groove in the plates to make the stacked laminate mold 10. Each plate 12 includes a first major surface 14 and a second major surface 16. A plurality of the plates 12 are stacked adjacent to one another such that the first major surface 14 of one plate 12 is adjacent the second major surface 16 of an adjacent plate 12. Each plate 12 also includes a mold surface 18. As seen in FIG. 2, which is a top view of the stacked plates of FIG. 1, each plate 12 also includes a first edge 20 and second edge 22 at the intersection of mold surface 18 with first major surface 14 and second major surface 16, respectively. Each plate 12 also includes a first end 24 and a second end 26. In one preferred embodiment, each plate 12 is a regular rectangular solid with first and second major surfaces 14 and 16 being parallel to one another and of the same size, with first end 24 and second end 26 being parallel to one another and of the same size, and with mold surface 18 joining the top edges of first and second major surfaces 14 and 16 and first and second ends 24 and 26 at a right angle. Each of the plates 12 may be of identical size and configuration or, in the preferred mode as illustrated, alternating plates may be of different length such that there is a first group of plates each having a shorter first length and a second group of plates each having a longer second length with the plates 12 arranged so as to alternate the long and short plates. Each of the plates 12 includes a major plane 28 which is parallel to and between the first and second major surfaces 14 and 16. Each plate 12 further includes a minor plane 30 defined by the plane of the mold surface 18. As seen in FIG. 1, the mold surfaces 18 of the stack of plates 12 should be carefully formed so as to present a continuous, uninterrupted surface made up of each of the individual mold surfaces 18.

Figure 3:
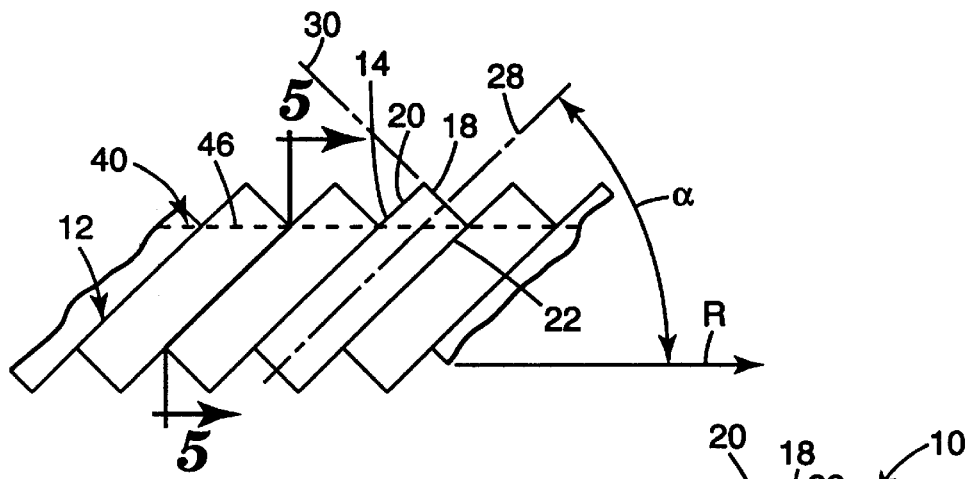
FIG. 3 is a side view of the stacked laminate mold of FIG. 1, in which the plates have been oriented at a first orientation and have had a groove formed therein.
Figure 4:
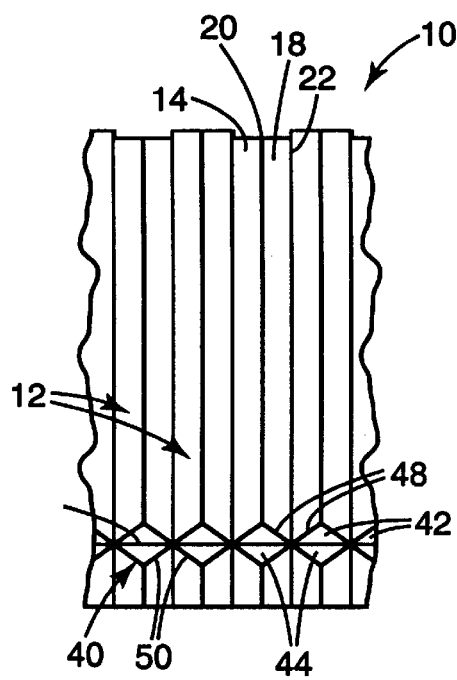
FIG. 4 is a top view of the stacked laminate mold of FIG. 3.
Figure 15:
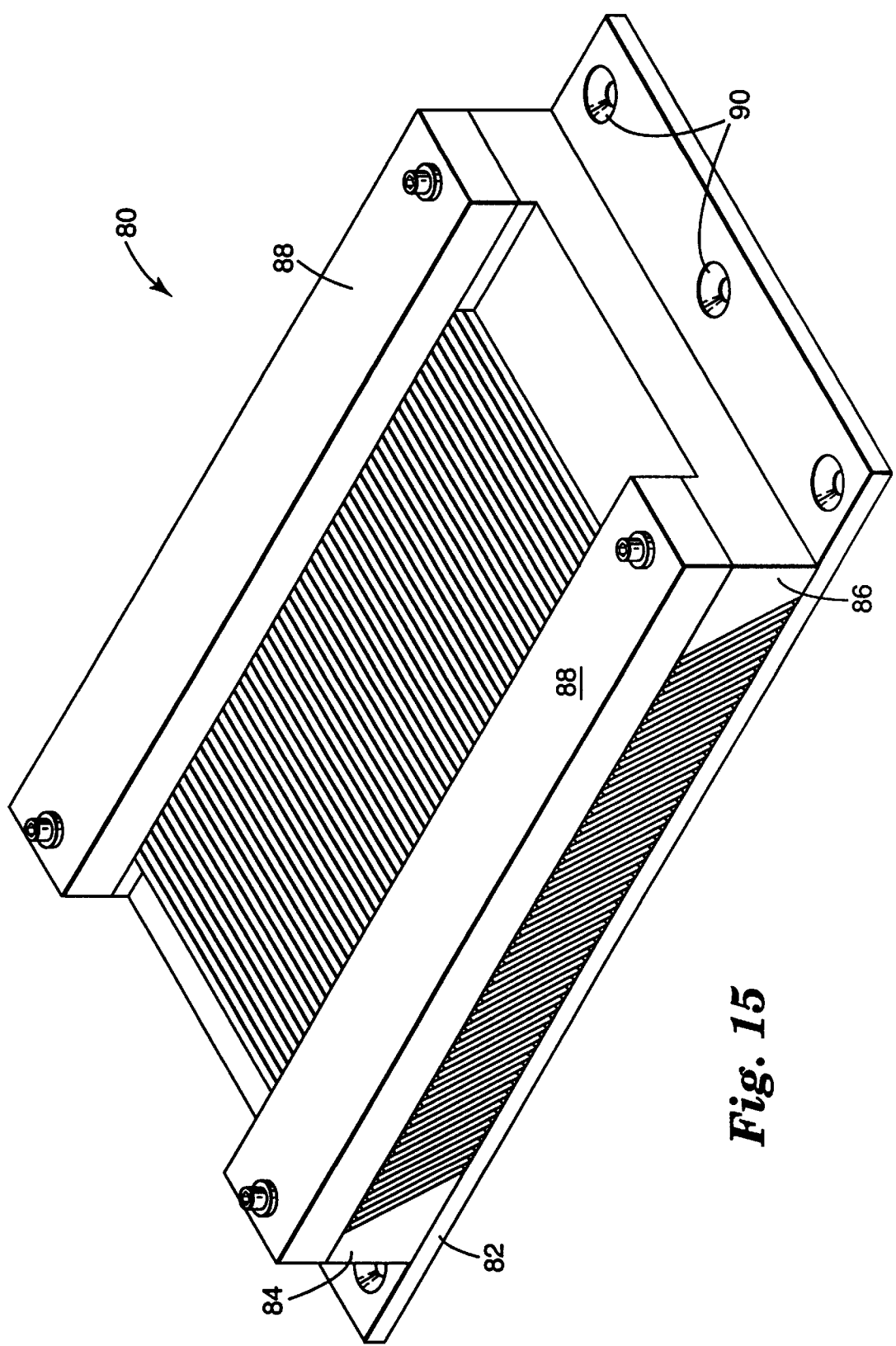
FIG. 15 is an isometric view of a frame holding a plurality of plates of FIG. 3.

Formation of the cavities in the stacked laminate mold proceeds as follows according to a first preferred embodiment. The plates 12 are provided in a suitable frame 80 (see FIG. 15) to secure all of the plates together such that the major plane 28 of each plate is at an incline angle α relative to a reference plane R as illustrated in FIG. 3. Frame 80 includes base 82 to which are affixed incline blocks 84 and 86 form orienting plates 12 at angle α. Frame 80 also includes crossbars 88 form securing the plates 12 in place. Holes 90 are provided in base 82 to aid in securing the frame 10 while forming grooves in the plates 12. Angle α is some angle different from angle β at which the plates provide a continuous mold surface comprising each of the individual mold surfaces 18. As seen in FIG. 4, the plates 12 have been held in place such that each of the first ends 24 are coplanar.

With the plates held at angle α, groove 40 is then formed through the mold surface 18 and first major surface 14 of each plate 12. In one preferred embodiment, groove 14 extends parallel to plane R so as to form individual groove segments of equal depth in each of the plates 12. It is also within the scope of the present invention to form the groove 40 non-parallel to plane R such that the groove depth varies from plate to plate.

Figure 5:
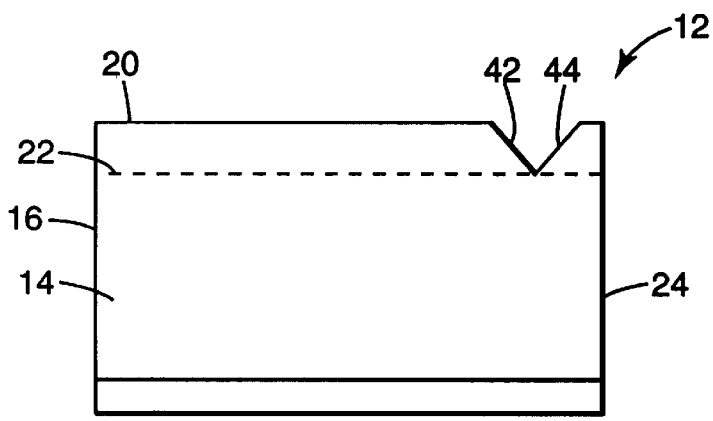
FIG. 5 is a plan view taken along line 5—5 of FIG. 4 of a single plate of the stacked laminate mold with a single groove formed therein.
Figure 12:
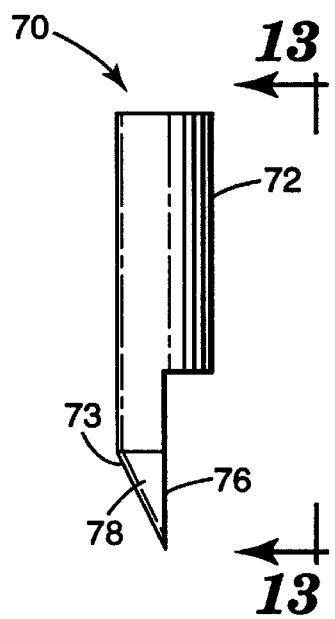
FIG. 12 is a side elevational view of a single point milling machine cutter useful in making the stacked laminate mold of FIG. 3.
Figure 13:
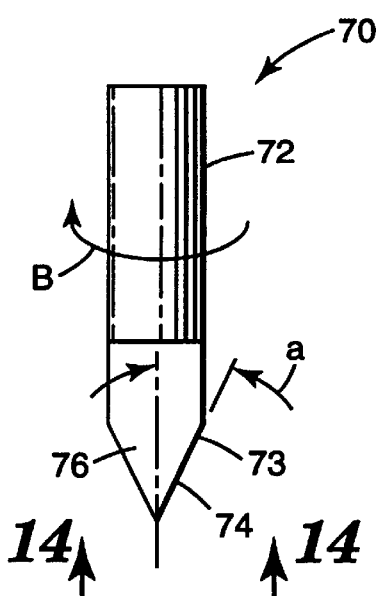
FIG. 13 is a front elevational view of the cutter of FIG. 12.
Figure 14:
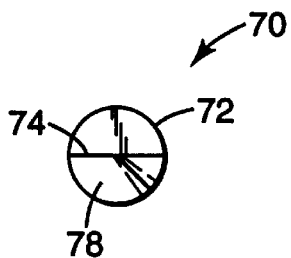
FIG. 14 is a bottom end view of the milling machine cutter of FIG. 12.

In one preferred embodiment illustrated in FIGS. 4 and 5, groove 40 is a V-shaped groove comprising first and second planar surfaces 42 and 44 meeting at base 46, which in this embodiment is a line at 46. FIGS. 12—14 illustrate a preferred embodiment of a single point milling machine cutter useful in cutting V-shaped groove 40. The single point milling machine cutter 70 includes a cylindrical shaft 72 suitable for mounting in known milling machines. At one end of the shaft 72 is a working end 73 for cutting the groove 40. Working end 73 includes a straight cutting edge 74 formed at the intersection of a tapered surface 78 with a recessed surface 76 as seen in FIGS. 12 and 13. The milling machine cutter 70 is rotated in direction B as it is traversed relative to the plurality of plates 12 for forming the groove 40. Angle (a) is the included angle between the cutting edge 74 and the longitudinal axis of the cutter 70. Angle (a) will define the included angle of the V-shaped groove 40, that is the included angle of the groove 40 will be twice angle (a). Both the tapered surface 78 and the edge of the tool opposite the cutting edge 74 can preferably include a back taper or clearance taper as is known in the art. Other tools can also be used in cutting groove 40, including, for example, square end or round end milling machine cutters, a suitably tapered cutting or grinding wheel, or the like. In one preferred embodiment, the tool is translated relative to the plates along a line that lies in a plane that is perpendicular to the plate major plane 28 as illustrated in FIGS. 4—11. The tool may instead be translated along a line that lies in a plane oblique to the plate major plane 28.

Figure 6:
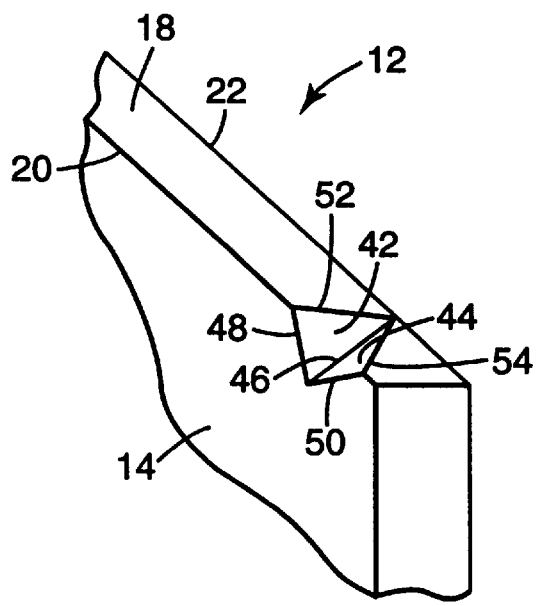
FIG. 6 is an isometric view of a the plate of FIG. 5.

To further illustrate the configuration of the cavities formed in the stacked laminate mold 10 by forming a V-shaped groove 40, a single plate 12 is illustrated in FIG. 6. It is seen that groove surfaces 42 and 44 meet at linear groove base 46. In the illustrated embodiment, first groove surface 42 intersects the plate first major surface 14 at first rear edge 48 and intersects mold surface 18 at first top edge 52. Similarly, second groove surface 44 intersects the plate mold surface 18 at second top edge 54 and intersects the first major surface 14 at second rear edge 50. Groove base 46 extends from first major surface 14 to mold surface 18. Groove surfaces 42 and 44 may extend to second edge 22 of the mold surface 18 as illustrated, or may terminate some distance away from second edge 22.

The term "groove surface" is generally used when discussing the configuration of the groove formed in the plurality of plates 12, and the term "cavity surface" is generally used to describe those groove surfaces when the plates 12 are configured to form a mold. However, the terms "groove surface" and "cavity surface" are interchangeable throughout.

Figure 7:
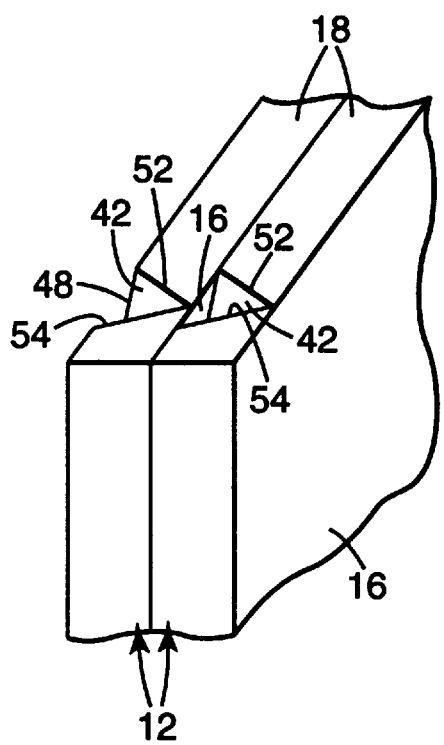
FIG. 7 is an isometric view of two adjacent plates of the mold of FIG. 3, oriented at a second angle.

FIG. 7 illustrates two adjacent plates 12 returned to incline angle β which positions the plurality of plates into a molding position. Incline angle β is that orientation at which the mold surfaces 18 of each of the plates 12 form a continuous, coplanar mold surface of the stacked laminate mold 10. It is seen that pyramidal cavities are formed by the V-shaped grooves, each individual cavity being bounded by first cavity surface 42 and second cavity surface 44 of one of the plates 12, and by a third cavity surface formed by a portion of the second major surface 16 of an adjacent plate 12. Such a cavity is used to mold a triangular-based pyramidal protrusion. For clarity, only two plates 12 are illustrated in FIG. 7; however, it is understood that any number of plates 12 may be combined together to form the grooves in the plates at first incline angle α and to form the mold 10 at the second incline angle β.

In one preferred embodiment; a plurality of parallel grooves 40 are formed through each of the plates 12 while they are oriented in their groove-forming orientation at angle α. Upon returning the plates to their second, mold-forming orientation at angle β, this will result in a plurality of triangular-based cavities as illustrated in FIG. 10. It is also within the scope of the present invention to form a plurality of grooves not parallel to one another. In one preferred embodiment, angle β is 90° relative to reference plane R, and angle α is 45° relative to plane R. It is also within the scope of the present invention for the mold forming orientation at angle β to be less than or greater than 90°. Preferably, mold surfaces 18 of each plate are formed to be continuous and coplanar when the plates 12 are at angle β. Such an arrangement will allow the final molded article to have a generally planar base with the protrusions extending from the planar base. However, for certain applications it may be desirable that the final molded article have a grooved base with protrusions extending therefrom. In such an arrangement, the individual mold surfaces 18 need not be continuous and coplanar when the plates are at mold forming angle β. As to groove forming orientation angle α, it can be greater than or less than angle β. In other words, the plates may be tilted in either direction from angle β during formation of the groove. It is also within the scope of the present invention to form one or more grooves with the plates held at a first angle α and then form one or more grooves with the plates held at a second angle α so as to form different configurations of the cavities within a single stacked laminate mold 10.

An alternate embodiment of the V-shaped groove 40 is illustrated in FIGS. 8 and 9. FIG. 8 illustrates a single plate; however, it is understood that this groove can be advantageously formed by cutting through a plurality of plates 12 as explained with respect to FIGS. 3 and 4. In the embodiment illustrated in FIG. 8, the first and second groove surfaces are cut deep enough into the plate 12 such that first groove or cavity surface 42 intersects the plate mold surface 18 at first top edge 52, first major surface 14 at first rear edge 48, and second major surface 16 at first forward edge 56. Similarly, second groove surface 44 intersects the plate mold surface 18 at second top edge 54, first major surface 14 at second rear edge 50, and second major surface 16 at second forward edge 58. With such a groove, the groove base 46 extends from the first major surface 14 to the second major surface 16. Preferably, groove base 46 is oblique to the mold surface 18; however, it is also within the scope of the present invention for the groove base 46 to be parallel to mold surface 18.

An individual cavity formed by the groove of FIG. 8 is illustrated with respect to FIG. 9. For illustrative purposes, FIG. 9 illustrates plate 12 having groove 40 formed therein, with plate 12 being between two optional spacer plates 12' not having a groove formed therein. It is understood that adjacent plates 12 may each have cavities formed therein if spacer plates 12' are not used. It is seen that the cavity of the second embodiment is bounded by the first cavity surface 42, second cavity surface 44, a third cavity surface formed by a portion of the second major surface 16 of the plate immediately behind plate 12, and a fourth cavity surface formed by a portion of the first major surface 14 of the plate immediately in front of plate 12. Such a cavity is used to mold a protrusion having a four-sided base.

As seen in FIG. 10, each of the plates 12 can be oriented such that first ends 24 are coplanar during the groove-forming process at angle a and upon returning the plates to their mold-forming orientation at angle β. Accordingly, rows of cavities in adjacent plates 12 are in line relative to one another in direction A. This can be seen by noting that the groove base line 46 of a cavity in one plate is aligned with the groove base 46 of the cavities immediately behind and in front each respective cavity. In one preferred embodiment, adjacent grooves 40 are formed such that the widest portion of the cavity at the intersection of the cavity with first surface 14 is touching or nearly touching the widest portion of the cavity adjacent to that on the same plate 12. It is also within the scope of the invention that adjacent cavities within a single plate 12 may be spaced as far apart from one another as desired.

FIG. 11 illustrates a convenient and simple means for staggering the cavities in adjacent plates 12 so that the cavities in adjacent plates are not in line in direction A. In FIG. 11, the plates have been oriented such that each of the first ends 24 are coplanar during machining as described above and then reoriented such that each of the second ends 26 are coplanar when the plates are held in their mold-forming orientation at incline β. In one preferred embodiment, the difference in length between the longer plates and the shorter plates is equal to one half the pitch of adjacent grooves 40. Upon aligning the plates at second end 26, the cavities in one plate will be between cavities in an adjacent plate 12 as illustrated in FIG. 11. By varying the lengths of the plates and aligning first ends 24 during groove forming and the second ends 26 during mold formation, it is possible to arrange grooves in adjacent plates in any desired pattern. In addition to having the length difference being one half the pitch of adjacent grooves, it is also possible to use any other difference in length. Furthermore, it is possible to progressively increase the length of two, three, four, or any number of adjacent plates so as to stagger the array of cavities in groups of two, three, four, or more plates.

In another preferred embodiment, the cavities 40 may be formed in a single plate at a time, rather than by cutting a groove through a plurality of plates as described above. In this alternate embodiment, it is possible to form a plurality of cavities 40 in at least the mold surface 18 and first major surface 14 in one plate at a time, by any of a variety of means. Such cavities can be formed with a single point milling machine cutter 70 described above, or with any suitable grinding or cutting wheel, for example. It is also possible to stamp individual plates 12 with the desired cavity arrangements, or to mold individual plates having the individual cavities. It is also possible to etch or engrave each of the cavities 40 in plate 12 as is well known in the art. After forming a desired number of plates 12 by such a method, the plurality of plates could be assembled so as to form the stacked laminate mold 10 as described above.

In another preferred embodiment, spacer plates 12' are inserted between plates 12. Spacer plates 12' do not have any cavities, and serve to enclose the cavities as described above with respect to the staggered plates 12, and to separate rows of cavities 40 by any desired thickness of the spacer plate 12. It is also within the scope of the present invention to take plates with different groove geometries formed by any of the methods described herein and assembling these in any desired pattern to provide a stacked laminate mold 10 having varying cavity geometries. Such an arrangement can include discrete cavities of different configuration, or can be arranged such that cavities in adjacent plates combine to form a composite cavity. Composite cavities can be used to form composite protrusions that are a combination of either like or dissimilar individual protrusions.

In still another preferred embodiment, plates 12 are circular, rather than rectangular. In this embodiment, grooves 40 are formed in plates 12 one plate at a time by any of the means described herein. A circular stacked laminate mold may be advantageously used in continuously processing a web form of a molded article rather than the batch processing used with the rectangular plates described above.

Figure 16:
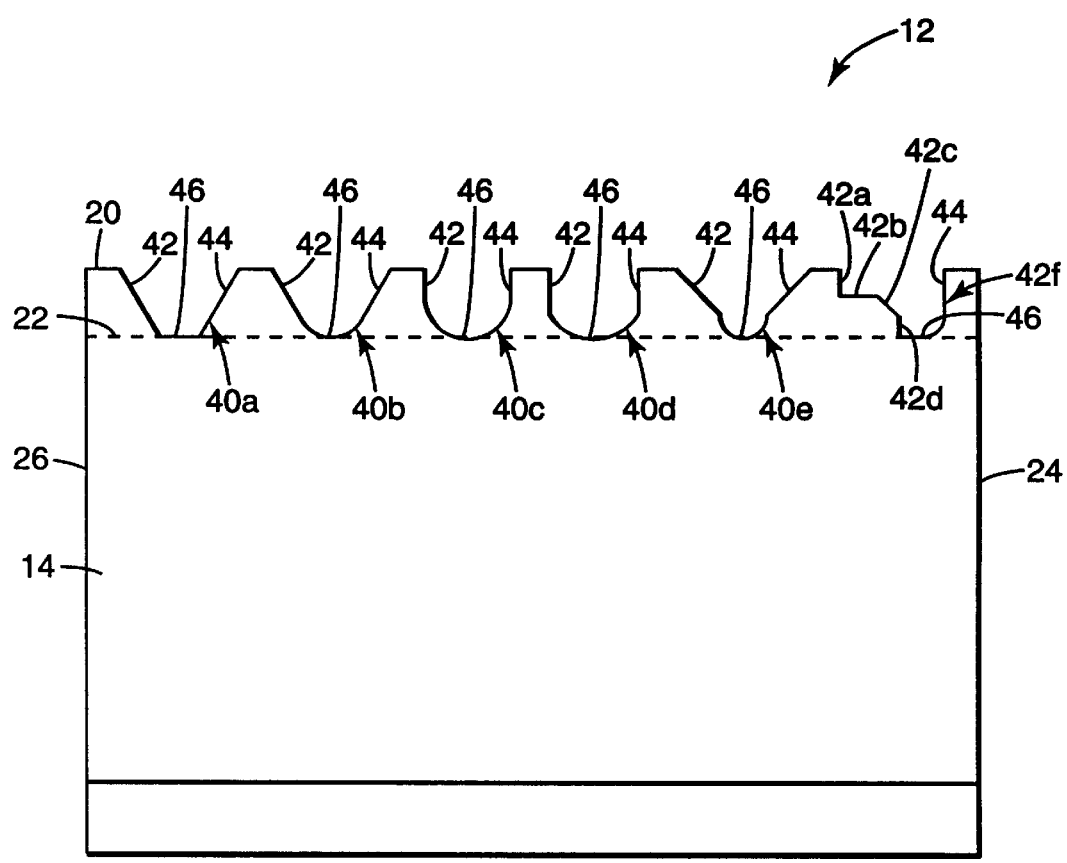
FIG. 16 is a view like FIG. 5 showing alternate embodiments of grooves according to the present invention.

Other groove shapes are within the scope of the present invention. FIG. 16 illustrates some of the many groove variations that fall within the scope of the present invention. For example, either or both of surfaces 42 and 44 could be curvilinear or arcuate as opposed to planar, or can comprise any desired number of discrete and adjacent planar and curvilinear portions. Furthermore, rather than a V-shaped groove meeting at a line at base 46 as illustrated in FIGS. 5–11, groove base 46 could itself be a surface. For example, groove 40a includes a planar groove base 46 and groove 40b includes a curvilinear groove base 46 joining the first and second groove surfaces 42 and 44. It is also possible that groove surfaces 42 and 44 could together form a continuous surface as seen in groove 40c. As seen with respect to groove 40d, the groove can comprise parallel and planar first and second surfaces 42 and 44 and an arcuate groove base 46 between the first and second surfaces. As seen in groove 40e, the groove can comprise generally V-shaped first and second surfaces 42 and 44, joined by an arcuate groove base 46 which intersects the first and second surfaces at a discontinuity rather than smoothly. It is also possible for the groove to include any desired number of surfaces as illustrated with respect to groove 40f. For example, groove 40f includes a plurality of planar first surfaces 42a, 42b, 42c, and 42d and a planar second surface 44 joined by an arcuate surface 46. It is to be understood from the foregoing non-limiting examples that the profile of the groove 40 can be any desired shape. For grooves having a plane of symmetry at groove base 46, the grooves can be conveniently cut with a single point milling machine cutter 70 having a cutting edge 74 configured to produce the desired groove contour. Such grooves can be conveniently made either with the process described herein with respect to FIGS. 1–4 or by forming the plates one at a time by any other method described herein.

As illustrated in FIG. 16, groove 40 can be formed with a plate 12 oriented at angle α such that the groove base 46 is oblique to the plate mold surface 18. It is understood, of course, that the groove 40 can also be parallel to plate mold surface 18 if the grooves are cut while the plates are held at angle β. When the groove base 46 is parallel to the mold surface 18, the cavity formed is a portion of a cylindric surface. As the term "cylindric surface" is used herein, it refers to the surface generated by taking a two-dimensional region as illustrated by the groove contours 40 in FIGS. 5 and 16 and translating this region along a straight line through space. In one preferred embodiment, the line of translation lies in a plane perpendicular to plate major plane 28. It is also within the scope of the present invention for the line of translation to lie in a plane oblique to plate major plane 28. The cavity thus formed is analogous to a cylindric solid with the groove surfaces being that portion of the cylindric surface included within the plate 12. The terms "cylindric surface" and "cylindric solid" are used herein with respect to surfaces and regions bounded either by planar surfaces or curvilinear surfaces. Orienting the plates at angle α different from angle β is a convenient means for forming cylindric surfaces which are the construct of moving the region in a direction oblique to mold surface 18. Orienting plates 12 at angle α equal to angle β is a convenient means for translating the cylindric surface in a direction parallel to mold surface 18. It is also possible to form cavities which are a portion of a torus by revolving a two-dimensional region as illustrated by the groove contour in FIGS. 5 and 16 about an axis which is eccentric to the region.

One embodiment of a stacked laminate mold can be made as follows. Eighty acrylic plates 12 are provided, each being 3.175 mm (0.125 in) thick, approximately 20.3 cm (8.0 in) long, and approximately 2.0 inches high. The plates then have 0.5 inch holes drilled through the major surfaces to allow the plates to be fixtured at orientation angle β of 90° relative to reference plane R. The bottom surface and mold surface 18 of each of the plates 12 in the assembled stack are then machined so as to provide continuous, coplanar surfaces. The bottom surfaces of the plates are marked for reference, and the stack is disassembled. Forty of the plates 12 are then reassembled in a stack, and are machined to 20.3 cm (8.0 in) in length. The remaining forty plates 12 are reassembled and machined to 20.19 cm (7.950 in) in length. The eighty plates 12 are then reassembled with alternating long and short plates, with the first ends 24 of each plate 12 coplanar, and with the plates held at orientation angle α of 45° relative to reference plane R. A plurality of parallel V-shaped grooves 40 are then machined into the mold surface 18 of the plurality of plates with a single point milling machine cutter 70 as described above. The groove 40 has an included angle at the intersection 46 of groove surface 42 and 44 of 68.60°, with the grooves at approximately 2.54 mm (0.100 in) intervals across a 12.7 cm (5.0 in) width of the plates 12. The cavities formed when the pates are returned to orientation angle β are configured for forming triangular-based pyramid protrusions, have a maximum depth at the intersection of base 46 with first major surface 14 of approximately 2.5 mm (0.100 in), a width measured at first edge 20 of the mold surface 18 of approximately 2.3 mm (0.090 in), and extend to within approximately 0.5 mm (0.02 in) of the second edge 22 of mold surface 18. The plates 12 are then aligned so as to be coplanar at second end 26 to stagger the cavities in adjacent plates by an amount approximately equal to one-half the distance between adjacent cavities. In one preferred embodiment, the cavities have a depth of from 0.6 to 6.0 mm (0.024 to 0.24 in), a length of from 0.6 to 6.0 mm (0.024 to 0.24 in), and a maximum width of from 0.6 to 6.0 mm (0.024 to 0.24 in), although larger and smaller cavities are also within the scope of the invention. With V-shaped grooves, the groove surfaces preferably have an included angle of from 20 to 160°.

The plates 12 of the stacked laminate mold 10 may be constructed of a conductive material such as nickel or brass, or alternatively, by a non-conductive material having a conductive outer coating or layer. Non-conductive plates, such as acrylic plates 12, may be provided with a conductive coating on at least the mold surface 18 and cavity surfaces to allow electrodeposition on the stacked laminate mold. as follows. Such a coating may be applied by any suitable known method, such as vapor coating. One particular method of applying a silver coating is described as follows.

The surfaces to be coated are first cleaned. Next, the surface is sensitized by spraying with a suitable sensitizer, such as an acidified stannous chloride solution, for approximately one minute. One such solution can be prepared by combining 40 grams of stannous chloride, 10 milliliters of con-hydrochloric acid, and 1 gallon of distilled water. The mold 10 is then rinsed with distilled water. A silver solution and reducer solution are then applied simultaneously with a dual nozzle spray gun. A suitable reducer can be made by combining 26 grams of dextrose, 2.5 milliliters of formaldehyde, and 1 gallon of distilled water. A suitable silver solution can be made by adding to 1 gallon of distilled water, in order: 10 grams potassium hydroxide; 50 milliliters ammonium hydroxide; and 22.5 grams of silver nitrate. The mold is then rinsed with distilled water is and ready for electrodeposition.

As discussed above, the stacked laminate mold may be used to mold an intermediate mold. The intermediate mold formed with stacked laminate mold 10 can be any desired material. In one preferred embodiment, a nickel mold is formed from stacked laminate mold 10 by an electrodeposition process. For the purposes of this invention, the term "electrodeposition" includes both "electrolytic" and "electroless" plating, which differ primarily in the source of the electrons used for reduction. In the preferred electrolytic embodiments, the electrons are supplied by an external source, such as a direct current power supply, whereas in the electroless plating process the electrons are internally provided by a chemical reducing agent in the plating solution.

If the stacked laminate mold 10 comprises metal plates 12, the preferably at least the mold surfaces 18 and the cavity surfaces of the stacked laminate mold 10 are passivated, such as by contacting the surfaces with a 2% solution of potassium dichromate in distilled water at room temperature. The mold 10 is then rinsed with distilled water. Passivation of the surfaces to be electroplated is desirable in that it provides a thin oxide coating which facilitates removal of an electroformed article from a metal mold 10. Passivation may not be necessary in the case where the mold 10 comprises non-conductive plates 12 and is provided with a conductive coating as previously discussed. In this case the conductive layer is transferred from the mold 10 to the electroformed article as hereinafter produced to facilitate removal of the electroplated article from the mold 10.

The mold 10 can then be immersed in a plating bath for a desired period of time for the electrodeposition of a material on the surface of the mold. Any appropriate eletrodepositable material may be used, such as nickel, copper, or alloys thereof.

In one embodiment of this invention, the plating bath consists of a solution of nickel sulfamate (16 oz. of Ni/gal.); nickel bromide (0.5 oz./gal.); and boric acid (4.0 oz./gal.) in distilled water with a specific gravity of 1.375–1.40. Anodes are provided in the form of S-nickel pellets. The pellets are immersed in the plating bath and carried in titanium baskets enclosed in polypropylene fabric anode basket bags. The temperature of the plating bath is maintained at 120° F. and a pH of 3.84–4.0. Normally during operations, the pH of the plating bath rises. Therefore, the pH is periodically adjusted by the addition of sulfamic acid. Evaporation loses are compensated for by the addition of distilled water to maintain the desired specific gravity. The plating bath is continuously filtered, such as through a 5 micron filter. The filtered output of the pump is preferably directed at the mold 10 to provide fresh nickel ions. This also provides a desired agitation to the electrodeposition solution. Electrodeposition should continue until the plated structure has enough thickness and strength to facilitate removal from the stacked laminate mold. In one preferred embodiment, the nickel article is approximately 2.5 mm (0.1 in) thick.

The deposition of the nickel on the mold 10 is a function of the D.C. current applied, with 0.001 inch/hour of nickel deposited on a flat surface at average current density rate of 20 amperes per square foot (ASF). However, the electrodeposited material may have a tendency to accumulate at a faster rate in electrolytic deposition adjacent sharp changes in the geometry of the mold 10, such as at the base 46 of the cavities.

After the nickel inverse of the stacked laminate mold is formed, it is possible to modify the shapes of the protrusions extending from the base of the nickel positive. For instance, the tops of all of the protrusions can be machined off parallel to the plane of the base to create a frustum of whatever the original protrusion geometry was. For instance, where the protrusions in the nickel positive are pyramids, it is possible to make frusto-pyramids by machining off all of the vertices of the pyramidal protrusions. It is also possible to truncate the protrusions at some angle non-parallel to the base of the nickel positive. These truncated protrusions or frusto-protrusions may be made in the final molded article itself, or may be made in this intermediate nickel positive. When the nickel positive is so modified, a subsequent negative mold made from the nickel positive will then have cavities that are the inverse of the protrusions on the modified nickel positive, and will thus differ from the cavities in the initial stacked laminate mold 10.

After the nickel positive is provided as described above, a negative mold can be molded from the nickel positive. An illustrative and non-limiting list of suitable materials for the negative mold include silicone, plastisol, and polypropylene. It is also possible to form a second electrodeposited article form the first one. In this case, it is preferable to passivate the first article such as with a chromate passivation, to facilitate removal of the second plated article from the first.

An embodiment of a silicone mold can be formed as follows. The nickel positive is preferably heat treated in an air atmosphere at 400° F. for 4 hours. Then, a dam is formed around the periphery of the nickel positive described above, such that the uncured mold material can be held adjacent the surface of the nickel positive having protrusions molded by the cavities in the stacked laminate mold.

The silicone negative is then molded as follows. First, Sylgard 184 silicone elastomer available from Dow Corning Company, Midland, Michigan, is mixed with Sylgard curing agent in a 10:1 ratio. Next, this mixture is stirred vigorously for 1 minute and the bottom and sides of the mixing beaker are scraped. This mixture is then poured onto the surface of the nickel positive and contained by the dam. The nickel positive with the silicone mixture thereon is placed in a vacuum chamber at 25 inches of mercury for 15 minutes. The nickel positive with the silicone thereon is removed from the vacuum chamber and placed for 30 minutes in an oven heated to 400° F. The nickel positive with the silicone mixture thereon is removed from the oven and cooled by running cold water over it and then dried with pressurized air. The cured silicone negative is then removed from the nickel positive.

An example of a polypropylene negative mold can be formed from a nickel positive as follows. The nickel master is placed on a 3.2 mm (0.125 in) thick aluminum carrier plate of suitable size. A polypropylene extruded film or pellets are then placed onto the surface of the nickel tool. A brass plate which has been chrome-plated and polished and having a thickness of 0.8 mm (0.031 in) is then placed on the polypropylene material. A second aluminum carrier plate which is 3.2 mm (0.125 in) thick is then placed on the brass plate. This stacked assembly is then placed between the platens of a compression molding press that has been preheated to 350° F. One suitable press is a Wabash Hydraulic Molding Press Model V75H-24-CLX, 75-ton compression capacity molding machine, available from Wabash, MPI, of Wabash, Indiana. After approximately five minutes, a force of 150 psi is applied to the stacked assembly and held for a period of five minutes. A force of 500 psi is then applied for seven minutes to the stacked assembly. The heated stacked assembly is then cooled to 180° F. while maintained under the pressure of 500 psi. The pressure is then removed from the stacked assembly and the stacked assembly is removed from the press. The top carrier plate and brass plate are then removed from the stacked assembly, and the molded polypropylene material is then removed from the nickel positive.

It is possible to use the molds described herein to mold an article having different regions or groups. Each region can contain a group of like cavities or protrusions, with the cavities or protrusions differing from region to region. Such differences can be in cavity or protrusion size, configuration, and/or orientation. It is possible to combine portions of different intermediate molds such as the nickel mold or silicone molds described herein to mold such articles. It is also possible to combine portions of different final molded articles to achieve molded articles with the above-described regions or groups.

The present invention has now been described with reference to several embodiments thereof. The foregoing detailed description and examples have been given for clarity of understanding only. No unnecessary limitations are to be understood therefrom. It will be apparent to those skilled in the art that many changes can be made in the embodiments described without departing from the scope of the invention. Thus, the scope of the present invention should not be limited to the exact details and structures described herein, but rather by the structures described by the language of the claims, and the equivalents of those structures.

What is claimed is:

1. A stacked laminate mold, comprising:
   a plurality of plates, each of said plates including:
      opposed parallel first and second planar major surfaces defining therebetween
   a major plane of each of said plurality of plates;
      a planar mold surface connecting said first and second major surfaces; and
      a plurality of cavities in each of the plurality of plates, wherein each of the cavities is open at least to said mold surface and includes a cavity surface defined by a cylindric surface that is the construct of translating a two-dimensional cavity profile through said plate along a line that is oblique to at least one of said plate major surface and said plate mold surface, and wherein said cavity surface intersects each respective plate first major surface and each respective plate mold surface;
   wherein said first major surface of a first one of the plurality of plates is adjacent said second major surface of a second one of said plurality of plates.

2. The mold of claim 1, wherein said mold suaces of each of said plurality of plates are coplanar.

3. The mold of claim 1, wherein said mold surfaces of each of said plates is perpendicular to said respective first and second major surfaces of each plate.

4. The mold of claim 1, wherein said cavity surface includes a planar first cavity surface, a planar second cavity surface, and a base joining said first and second cavity surfaces, wherein said first cavity surface intersects each respective plate first major surface and each respective plate mold surface, wherein said second cavity surface intersects each respective plate first major surface and each respective plate mold surface, and wherein said base is oblique relative to at least one of said major plane and said mold surface.

5. The mold of claim 4, wherein said first and second cavity surfaces intersect so as to form a linear cavity base.

6. The mold of claim 4, wherein said first and second cavity surfaces further intersect said plate second major surface.

7. The mold of claim 1, wherein said cavity surface is defined by a cylindric surface that is the construct of translating said two-dimensional cavity profile through said plate along a line that is oblique to said major plane of said. plate.

8. The mold of claim 1, wherein said cavity surface is defined by a cylindric surface that is the construct of translating said two-dimensional cavity profile through said plate along a line that is oblique to said plate mold surface.

9. The mold of claim 1, wherein said cavity surface is defined by a cylindric surface that is the construct of translating said two-dimensional cavity profile through said plate along a line that is oblique to plate mold surface of said plate and said major plane of said plate.

10. The mold of claim 1, wherein each of said mold cavities are open at said mold surface of said plates and are bounded at least by:
    i) said cavity surface; and
    ii) said second major surface of a second one of said plurality of plates adjacent to said first major surface of said first plate.

11. The mold of claim 4, wherein each of said mold cavities are open at said mold surface of said plates and being bounded at least by:
    i) said first cavity surface in a first one of said plurality of plates;
    ii) said second cavity surface in said first plate;
    iii) said cavity base in said first plate; and
    iv) said second major surface of a second one of said plurality of plates adjacent to said first major surface of said first plate.

12. The mold of claim 11, wherein said first cavity surface intersects said second cavity surface at a line such that said cavity base comprises a line.

13. The mold of claim 11, wherein said first and second cavity surfaces have at an included angle of from 20° to 120°.

14. The mold of claim 11, wherein said first plate mold surface and said third cavity surface have an included angle of 90°.

15. The mold of claim 1, wherein said cavity surface further intersects said plate second major surface.

16. The mold of claim 15, wherein said mold cavities are open at said mold surface of said plates and are bounded at least by:
    i) said cavity surface;
    ii) said second major surface of a second one of said plurality of plates adjacent to said first major surface of said first plate; and
    iii) said first major surface of a third one of said plurality of plates adjacent to said second major surface of said first plate.

17. The mold of claim 6, wherein said mold cavities are open at said mold surface of said plates and are bounded at least by:

i) said first cavity surface in a first one of said plurality of plates;

ii) said second cavity surface in said first plate;

iii) said cavity base in said first plate;

iv) said second major surface of a second one of said plurality of plates adjacent to said first major surface of said first plate; and said first major surface of a third one of said plurality of plates adjacent said second major surface of said first plate.

18. The mold of claim 1, further comprising a plurality of spacers wherein a respective one of said plurality of spacers is adjacent a respective one of said plurality of plates, wherein each respective spacer overlays at least that portion of said first major surface of each respective plate intersected by said cavity surface.

19. A stacked laminate mold, comprising:

a plurality of plates, each of said plates including:

opposed parallel first and second major surfaces defining therebetween a major plane of each of said plurality of plates;

a mold surface connecting said first and second major surfaces; and a plurality of cavities in each of the plurality of plates, wherein each of the cavities is open at least to said mold surface and includes a cavity surface defined by a cylindric surface that is the construct of translating a two-dimensional cavity profile through said plate along a line that is oblique to at least one of said plate major surface and said plate mold surface, and wherein said cavity surface intersects each respective plate first major surface and each respective plate mold surface;

wherein said first major surface of a first one of the plurality of plates is adjacent said second major surface of a second one of said plurality of plates; and wherein each of said mold cavities are open at said mold surface of said plates and are bounded at least by:

i) said cavity surface; and ii) said second major surface of a second one of said plurality of plates adjacent to said first major surface of said first plate.

20. The mold of claim 19, wherein said mold surfaces of each of said plurality of plates are coplanar.

21. The mold of claim 19, wherein said mold surfaces of each of said plates is perpendicular to said respective first and second major surfaces of each plate.

22. The mold of claim 19, wherein said cavity surface includes a planar first cavity surface, a planar second cavity surface, and a base joining said first and second cavity surfaces, wherein said first cavity surface intersects each respective plate first major surface and each respective plate mold surface, wherein said second cavity surface intersects each respective plate first major surface and each respective plate mold surface, and wherein said base is oblique relative to at least one of said major plane and said mold surface.

23. The mold of claim 22, wherein said first and second cavity surfaces intersect so as to form a linear cavity base.

24. The mold of claim 22, wherein said first and second cavity surfaces further intersect said plate second major surface.

25. The mold of claim 19, wherein said cavity surface is defined by a cylindric surface that is the construct of translating said two-dimensional cavity profile through said plate along a line that is oblique to said major plane of said plate.

26. The mold of claim 19, wherein said cavity surface is defined by a cylindric surface that is the construct of translating said two-dimensional cavity profile through said plate along a line that is oblique to said plate mold surface.

27. The mold of claim 19, wherein said cavity surface is defined by a cylindric surface that is the construct of translating said two-dimensional cavity profile through said plate along a line that is oblique to plate mold surface of said plate and said major plane of said plate.

28. The mold of claim 22, wherein each of said mold cavities are open at said mold surface of said plates and being bounded at least by:

i) said first cavity surface in a first one of said plurality of plates;

ii) said second cavity surface in said first plate;

iii) said cavity base in said first plate; and iv) said second major surface of a second one of said plurality of plates adjacent to said first major surface of said first plate.

29. The mold of claim 28, wherein said first cavity surface intersects said second cavity surface at a line such that said cavity base comprises a line.

30. The mold of claim 28, wherein said first and second cavity surfaces have at an included angle of from 20° to 120°.

31. The mold of claim 19, wherein said cavity surface further intersects said plate second major surface.

32. The mold of claim 31, wherein said mold cavities are open at said mold surface of said plates and are bounded at least by:

i) said cavity surface;

ii) said second major surface of a second one of said plurality of plates adjacent to said first major surface of said first plate; and iii) said first major surface of a third one of said plurality of plates adjacent to said second major surface of said first plate.

33. The mold of claim 24, wherein said mold cavities are open at said mold surface of said plates and are bounded at least by:

i) said first cavity surface in a first one of said plurality of plates;

ii) said second cavity surface in said first plate;

iii) said cavity base in said first plate;

iv) said second major surface of a second one of said plurality of plates adjacent to said first major surface of said first plate; and v) said first major surface of a third one of said plurality of plates adjacent said second major surface of said first plate.

34. The mold of claim 19, further comprising a plurality of spacers wherein a respective one of said plurality of spacers is adjacent a respective one of said plurality of plates, wherein each respective spacer overlays at least that portion of said first major surface of each respective plate intersected by said cavity surface.

* * * * *

UNITED STATES PATENT AND TRADEMARK OFFICE
CERTIFICATE OF CORRECTION

PATENT NO. : 6,305,924 B1  Page 1 of 1
DATED : October 23, 2001
INVENTOR(S) : Krinke, Harlan L.

It is certified that error appears in the above-identified patent and that said Letters Patent is hereby corrected as shown below:

Column 3,
Line 13, delete "arc" and insert in place thereof -- are --.

Column 6,
Line 19, delete "." following "milling" and preceding "machine".

Column 7,
Line 63, delete "arc" and insert in place thereof -- are --.

Column 10,
Line 25, delete "arc" and insert in place thereof -- are --.

Column 13,
Line 60, delete "suaces" and insert in place thereof -- surfaces --.

Column 15,
Line 9, add -- v) -- preceding "said".

Signed and Sealed this

Fourth Day of June, 2002

*Attest:*

JAMES E. ROGAN
*Attesting Officer*  *Director of the United States Patent and Trademark Office*